PHOTOCONDUCTOR MATERIAL AND APPARATUS

Filed March 26, 1968 2 Sheets-Sheet 1

INVENTORS
EGON E. LOEBNER
THOMAS J. DIESEL
RICHARD H. BUBE

BY A. C. Smith

ATTORNEY

Sept. 9, 1969 E. E. LOEBNER ET AL 3,466,509

PHOTOCONDUCTOR MATERIAL AND APPARATUS

Filed March 26, 1968 2 Sheets-Sheet 2

INVENTORS
EGON E. LOEBNER
THOMAS J. DIESEL
RICHARD H. BUBE

BY A. C. Smith

ATTORNEY

United States Patent Office 3,466,509

Patented Sept. 9, 1969

3,466,509

PHOTOCONDUCTOR MATERIAL AND APPARATUS

Egon E. Loebner, Palo Alto, Thomas J. Diesel, Sunnyvale, and Richard H. Bube, Stanford, Calif., assignors to Hewlett-Packard Company, Palo Alto, Calif., a corporation of California Filed Mar. 26, 1968, Ser. No. 716,026

Int. Cl. H01l 3/00, 5/00

U.S. Cl. 317—234 3 Claims

ABSTRACT OF THE DISCLOSURE

Zinc counter-doped n-type silicon semiconductor material is made to respond to electromagnetic radiation at wavelengths up to 1.1 microns with quantum gains in excess of $10^4$ at room temperature.

Background of the invention

Conventional semiconductor photoconducting devices commonly use polycrystalline materials such as cadmium sulfide and cadmium selenide. These devices have severe limitations. They are sensitive to ambient conditions such as oxygen and water vapor which produce changes in their photoconductive properties. Because of the high bandgap of the materials used in the fabrication of these conventional devices, the characteristic presence of trapping defects slows down the response time of the devices to values many times longer than the majority carrier photoconductive lifetime. Most importantly such devices are unsatisfactorily responsive at room temperature to radiation at the wavelength produced by high-efficiency gallium arsenide light sources, or to any radiation at wavelengths longer than about 0.75 micron. The most common photoconductive devices for near-infrared wavelengths use the lead chalcogenides. These devices, however, are limited in performance because they are composed of polycrystalline layers of a small bandgap semiconductor with high dark conductivity. Also the photoconductive mechanism is thus far insufficiently understood and therefore the production of these devices remains essentially in the realm of art and lacks the usual fabrication controls of semiconductor devices. A few single crystal photoconductors, such as gallium arsenide, are known that are sensitive to wavelengths longer than 0.75 micron. These materials composition systems are also poorly understood and the structural or even chemical identity of the significant defects is mostly an open question. It is therefore desirable to provide a single crystalline material with high gain response to wavelengths longer than 0.75 micron, and with a photoconductive mechanism that is understood and hence controllable.

Summary of the invention

Accordingly, in the present invention, n-type monocrystalline silicon is counter-doped with zinc impurities which behave as acceptors of electrons, assuming a charge of −2. Because of this negative charge, the $Zn^{-2}$ atoms attract holes, i.e. they exhibit a large capture cross section for holes. After hole capture, the resulting $Zn^{-1}$ center is still negatively charged and hence repels electrons, i.e. has a small capture cross section for electrons. The effect of these incorporated sensitizing impurities is two-fold: They compensate (counter-dope) existing donors to give a higher resistivity by immobilizing electrons which were formerly free, and they greatly increase the lifetime of photon-generated excess electrons by immobilizing the holes, with which the electrons would otherwise quickly recombine at other recombination sites with large electron capture cross section. The concentration of these sensitizing impurities is kept as low as possible in order that the material exhibits very long electron lifetime at room temperature. The precise control of the degree of counter-doping results in the desired high dark resistance.

Description of the preferred embodiment

In order to provide photoconductive material which has a high speed of response and a high sensitivity to radiation at about the 1 micron wavelength, it is desirable to provide as low a concentration as possible of sensitizer centers which satisfy several important conditions. First, these sensitizer centers should allow only minimum transfer of holes captured by such centers to other competing recombination centers via thermal emission to the valence band of the material. This may be accomplished by reducing thermal emission to the valence band through choice of a material which has a large value of energy separation between the energy level of the sensitizer centers and the valence band. It is also necessary to minimize the relative capture probability of holes due to competing capture processes, and this can be done by keeping the relative number as well as the electron and hole cross sections of competing recombination centers at a minimum. There is thus an optimum condition of number and cross section of sensitizer centers which must be satisfied to provide a fast-response photoconductive material that is highly sensitive at room temperature. Conventional room temperature photoconductors in the present state of the art thus commonly comprise high energy bandgap material, typically higher than 1.7 ev., having sensitizer centers whose energy separation from the valence band is large, typically above 0.65 ev.

The photoconductive material of the present invention comprises monocrystalline silicon, which superficially appears not to satisfy the above criteria for high sensitivity room temperature photoconductivity. However, the energy level of the sensitizer centers introduced into the silicon is chosen close to the center of the energy gap. The number of such centers introduced is selected to provide the least concentration of centers with the large hole capture cross section needed to overcome the competing hole capture due to recombination centers inevitably present in silicon. In addition, the Fermi level position is adjusted for room temperature equilibrium by the "donorization" of sensitizer centers, i.e., by controlling impurity concentration so that the density of free electrons is nearly equal to or larger than the density of empty (of electrons) sensitizer centers. Also, the sensitizer centers are chosen to provide a high ratio of hole capture cross section to electron capture cross section.

Figure 1:
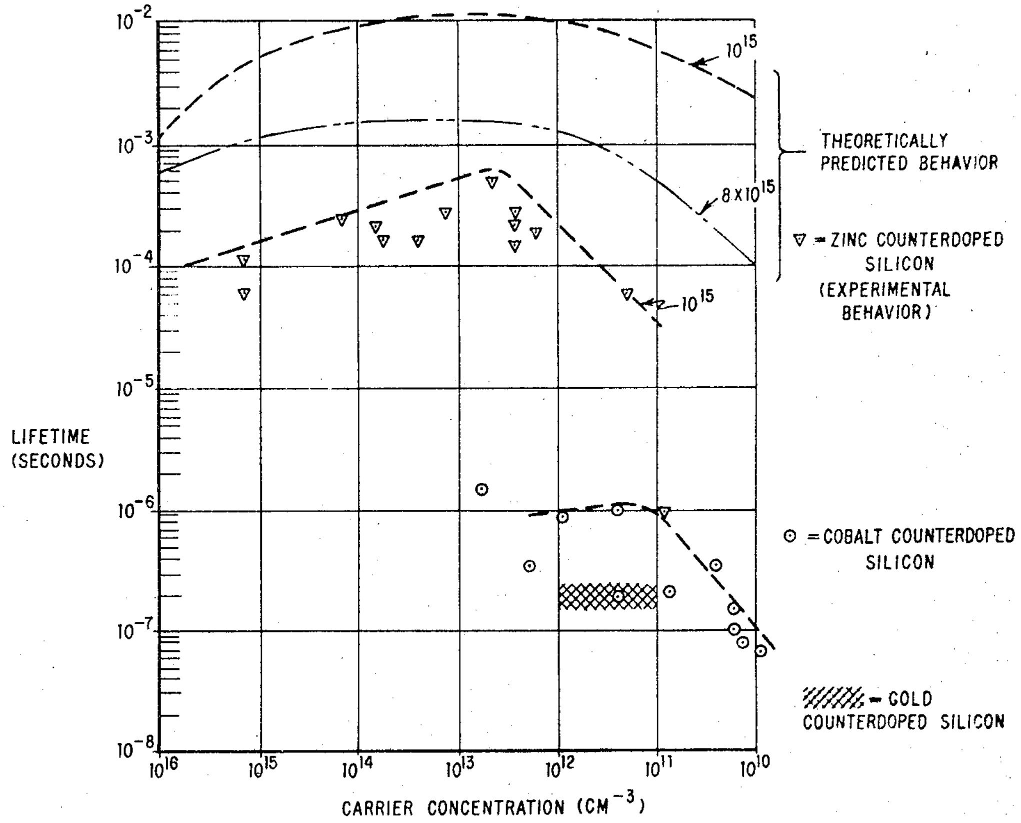
FIGURE 1 is a graph of photoconductor lifetimes in monocrystalline silicon as a function of conduction band electron concentration for zinc, cobalt and gold sensitizers.

It has been discovered that these conditions may be satisfied in monocrystalline silicon using impurities such as indium, thallium, gold, zinc, and cobalt. The graph of FIGURE 1 shows the experimental photoconductive lifetimes of silicon monocrystals as a function of conduction band electron concentration for three types of sensitizer sensors: zinc, cobalt and gold. The detailed data on some typical sample points in FIGURE 1 for zinc counter-doped silicon is shown below.

| Sample | Carrier Concentration After Zn Diffusion ($cm.^{-3}$) | Zn Density ($cm.^{-3}$) | Lifetime (Seconds) |
|---|---|---|---|
| A | $3.5\times10^{14}$ | $2.1\times10^{15}$ | $1.1\times10^{-4}$ |
| B | $1.5\times10^{12}$ | $1.0\times10^{15}$ | $1.8\times10^{-4}$ |
| C | $1.9\times10^{13}$ | $1.0\times10^{15}$ | $1.2\times10^{-4}$ |
| D | $1.4\times10^{12}$ | $1.3\times10^{15}$ | $1.1\times10^{-4}$ |
| E | $4\times10^{11}$ | $5.5\times10^{15}$ | $1.8\times10^{-6}$ |
| F | $4.5\times10^{13}$ | ------------ | $2.08\times10^{-4}$ |
| G | $1.8\times10^{12}$ | $1.1\times10^{15}$ | $1.4\times10^{-4}$ |
| H | $1.2\times10^{14}$ | $1.0\times10^{15}$ | $2.1\times10^{-4}$ |
| I | $3.2\times10^{12}$ | $1.1\times10^{15}$ | $1.0\times10^{-4}$ |
| J | $1.2\times10^{13}$ | $1.2\times10^{15}$ | $2.7\times10^{-4}$ |

Figure 3:
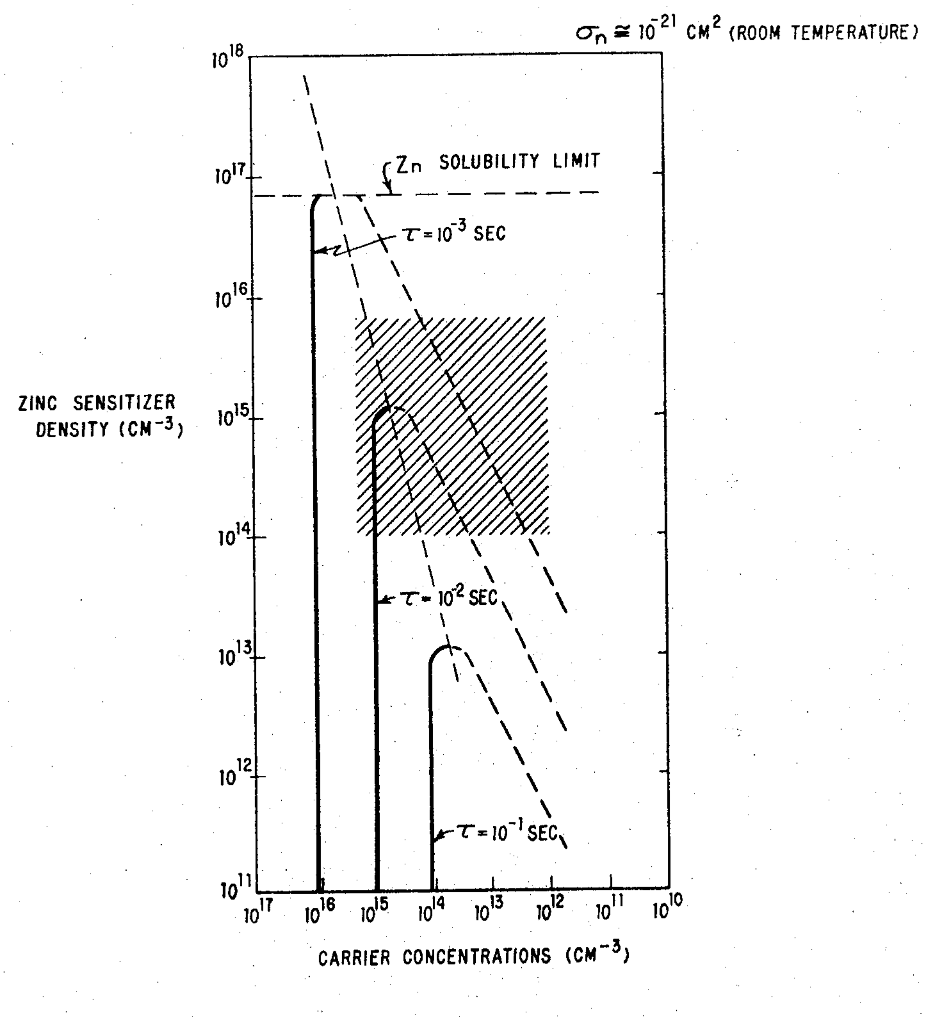
FIGURE 3 is a graph showing carrier lifetime as a function of carrier concentration and density of zinc sensitizing centers.

It is known that zinc may be incorporated into the silicon crystal structure interstitially (i.e. between sites of silicon atoms in the crystal lattice where it acts as a double donor) and substitutionally (i.e. in place of a silicon atom in the crystal lattice where it acts as a double acceptor). It is believed that substitutionally-incorporated zinc provides the best sensitizer centers in silicon. This is because zinc has an energy level located about 0.56 ev. from both the conduction band and the valence band of silicon, and because the optimum range of concentration of sensitizer centers at room temperature is less than $8\times10^{15}$ per cubic centimeter when the concentration of donor impurities is chosen so as to give a Fermi level position in the range of about .25 ev. to about 0.4 ev. below the conduction band, i.e. for conduction band electron concentrations at about 300° K. from about $5\times10^{11}$ to about $3\times10^{15}$ per cubic centimeter, as shown in FIGURE 3. Since the ratio of hole capture cross section to electron capture cross section for zinc impurity sensitizer centers is of the order of $10^9$, as determined by measuring the photoconductive gain at 77° K., the electron lifetime should be $10^{-1}$ seconds or greater. The electron capture cross section deduced from these low temperature gain measurements is about $10^{-21}$ $cm.^2$ The photo-conductive behavior at room temperature, however, is less than that predicted (see FIGURE 1) from this extremely small cross section. It is believed that this departure from predicted behavior is due to the following effects: (1) thermal quenching, that is, the removal by thermal agitation of a trapped hole from a zinc sensitizing center; (2) recombination of holes and electrons by way of unavoidable competing recombination centers, which, in samples tested, are positioned at about .16, .26, and .42 electron volt below the conduction band; and (3) the competing recombination traffic through the substitutionally-incorporated $Zn^{-1}$ centers.

In the present state of the art, high purity silicon has been found to include undesirable impurity defects introduced before or during fabrication in concentrations which are typically in excess of $10^{14}$ defects per cubic centimeter. Thus, since one zinc atom compensates two impurity defects present in the material, the lowest limit of zinc concentration in contemporary practice is also of the order of $10^{14}$ atoms per cubic centimeter, as shown in FIGURE 3. With further improvement of silicon technology, it is anticipated that this value may be lowered by a factor of about 500. In addition to undesirable impurity defects present in the material, atoms of a donor element such as arsenic or phosphorus, or the like, are introduced in sufficient quantity to produce a total concentration of all effective donor defects unintentionally and intentionally introduced which is at least twice the zinc concentration desired. Thus, impurity defects are counter-doped by zinc sensitizer centers which are introduced in the range of about $10^{14}$ to about $8\times10^{15}$ zinc atoms per cubic centimeter to yield photoconductive material which has Fermi level positions around 0.4 ev. and which operates at room temperature out to radiation wavelengths of about 1.1 microns with quantum gains of the order of $10^4$. Such material has a response time which exceeds carrier lifetime (typically as large as 500 microseconds) by factors of only about 2 to 5 when illuminated by commerical GaAs light emitting diodes. Lit resistance is typically a few ohms with dark resistance of several hundred ohms.

Figure 2:
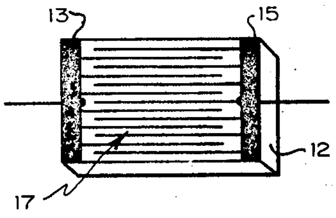
FIGURE 2 is a schematic diagram of a photoconductor including a body of semiconductor material in accordance with the present invention.

This material may form a portion of the body 12 of a photoconductor device, as shown in FIGURE 2, using conventional fabrication techniques. The electrodes 13, 15 may be formed in a conventional interdigital pattern to increase the area of the surface of the body 12 which is closely adjacent the electrodes 13, 15. The device thus shows high conductance in response to incident radiation 17 at about the 1 micron wavelength.

It will be apparent to those skilled in the art that the inclusion of silicon material of the kind described above as part of a body of a complex device such as a "long" (also referred to as $\tau$ modulating) diode or integrated circuit structures will lead to improved performance.

Therefore, photoconductive devices which comprise material having characteristics described above thus provide quantum gain and power gain at room temperature which far exceed the gains available from silicon photojunction diodes and transistors operating in the 1 micron region of radiation wavelength. Also, photoconductive devices using material according to the present invention do not have junctions and therefore do not exhibit typical junction effects such as unidirectional conductivity, photo voltage, junction capacity, and the like.

We claim:

1. Photoresponsive semiconductor material comprising: silicon semiconductor material including atoms of zinc on silicon sites in concentration less than about $8\times10^{15}$ $atoms/cm.^3$ and a 300° K. concentration of conduction band electrons between $5\times10^{11}$ and $3\times10^{15}/cm.^3$.

2. Photoresponsive semiconductor material as in claim 1 wherein said material is monocrystalline silicon.

3. Photoresponsive semiconductor material as in claim 1 wherein said material forms the body or part of the body of a photoresponsive device and includes contact means for applying electrical signal thereto.

References Cited

UNITED STATES PATENTS

| | | | |
|---|---|---|---|
| 2,871,377 | 1/1959 | Tyler | 307—88.5 |
| 3,342,651 | 9/1967 | Raithel | 148—188 |
| 3,176,151 | 3/1965 | Atalla | 307—88.5 |

JOHN W. HUCKERT, Primary Examiner

M. EDLOW, Assistant Examiner

U.S. Cl. X.R.

250—211; 317—235